April 17, 1934.  G. A. M. LAMBLIN-PARENT  1,955,603
LIGHT PROJECTOR
Original Filed Aug. 4, 1930   3 Sheets-Sheet 1
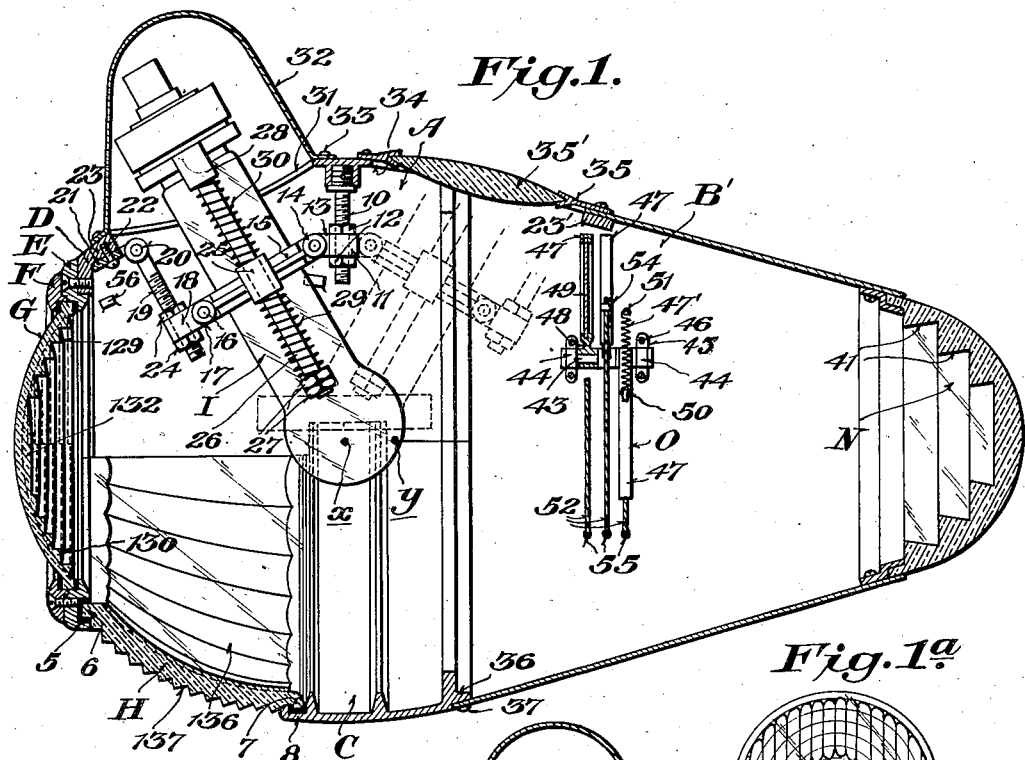
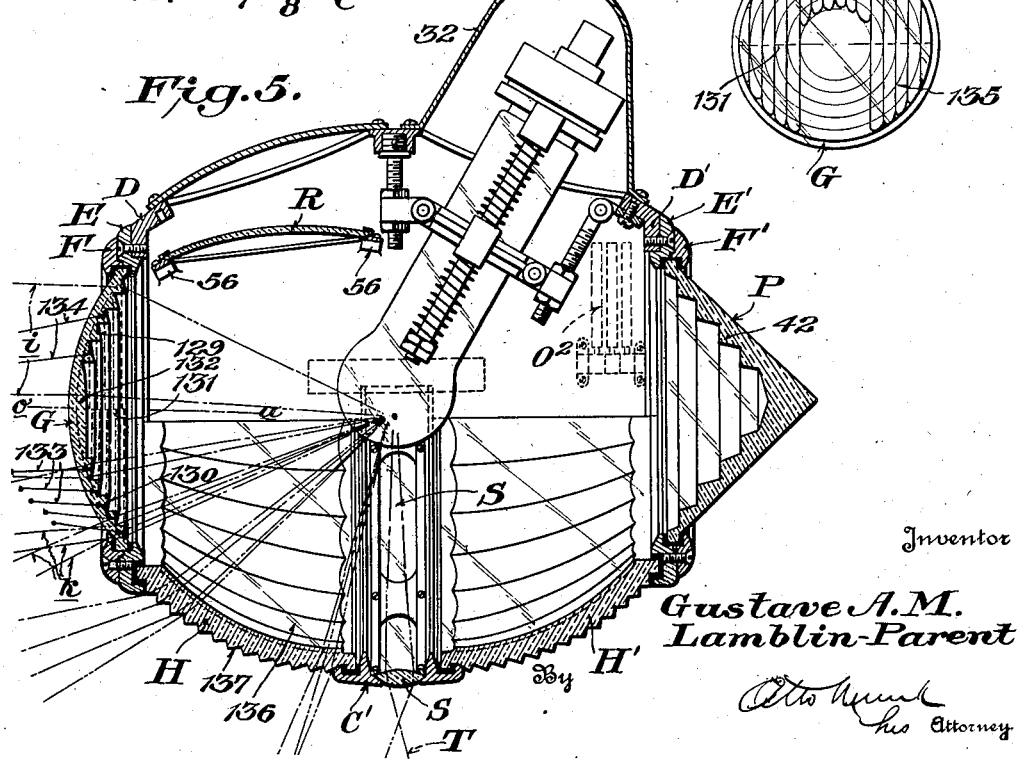
Inventor
Gustave A. M. Lamblin-Parent,
By his Attorney

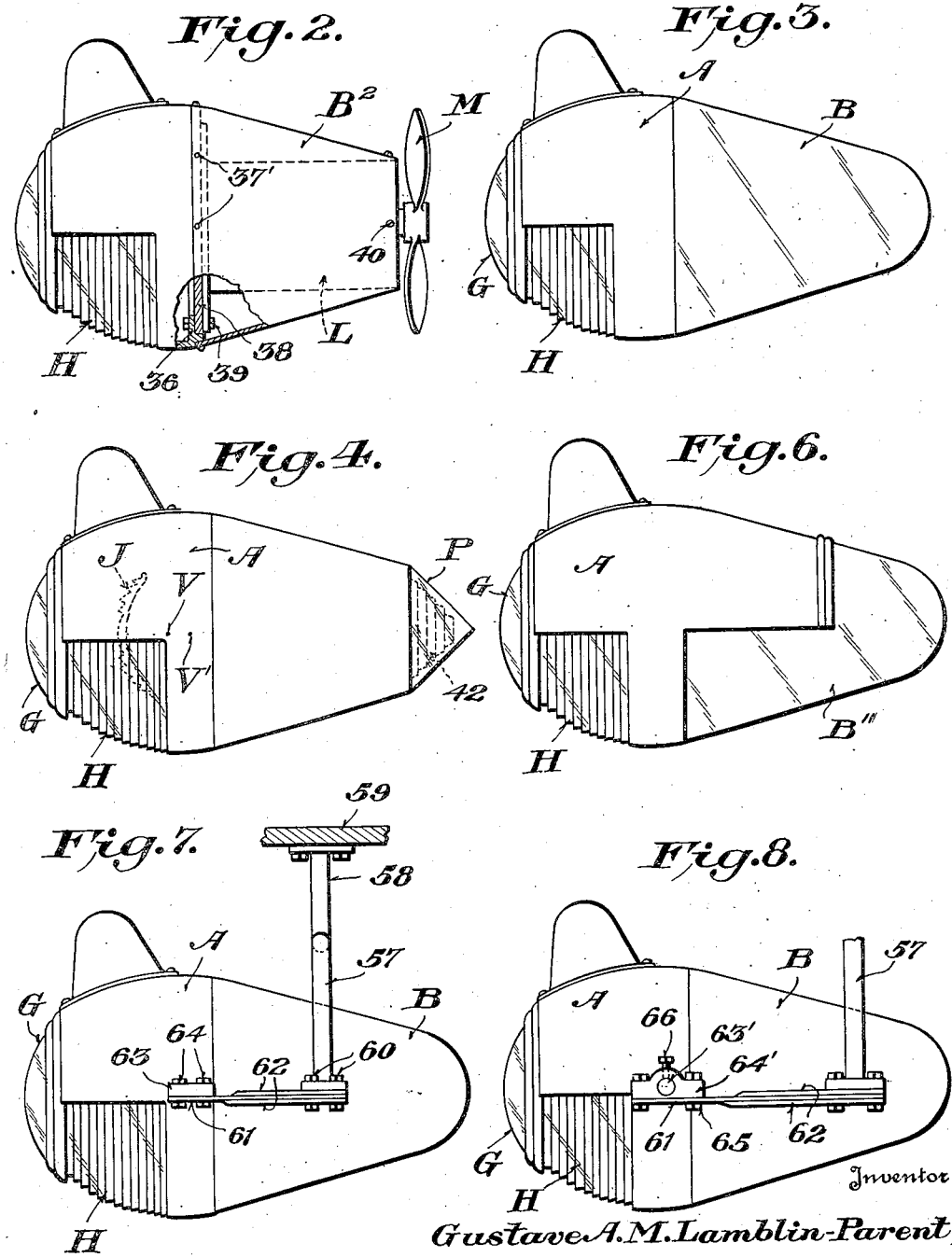

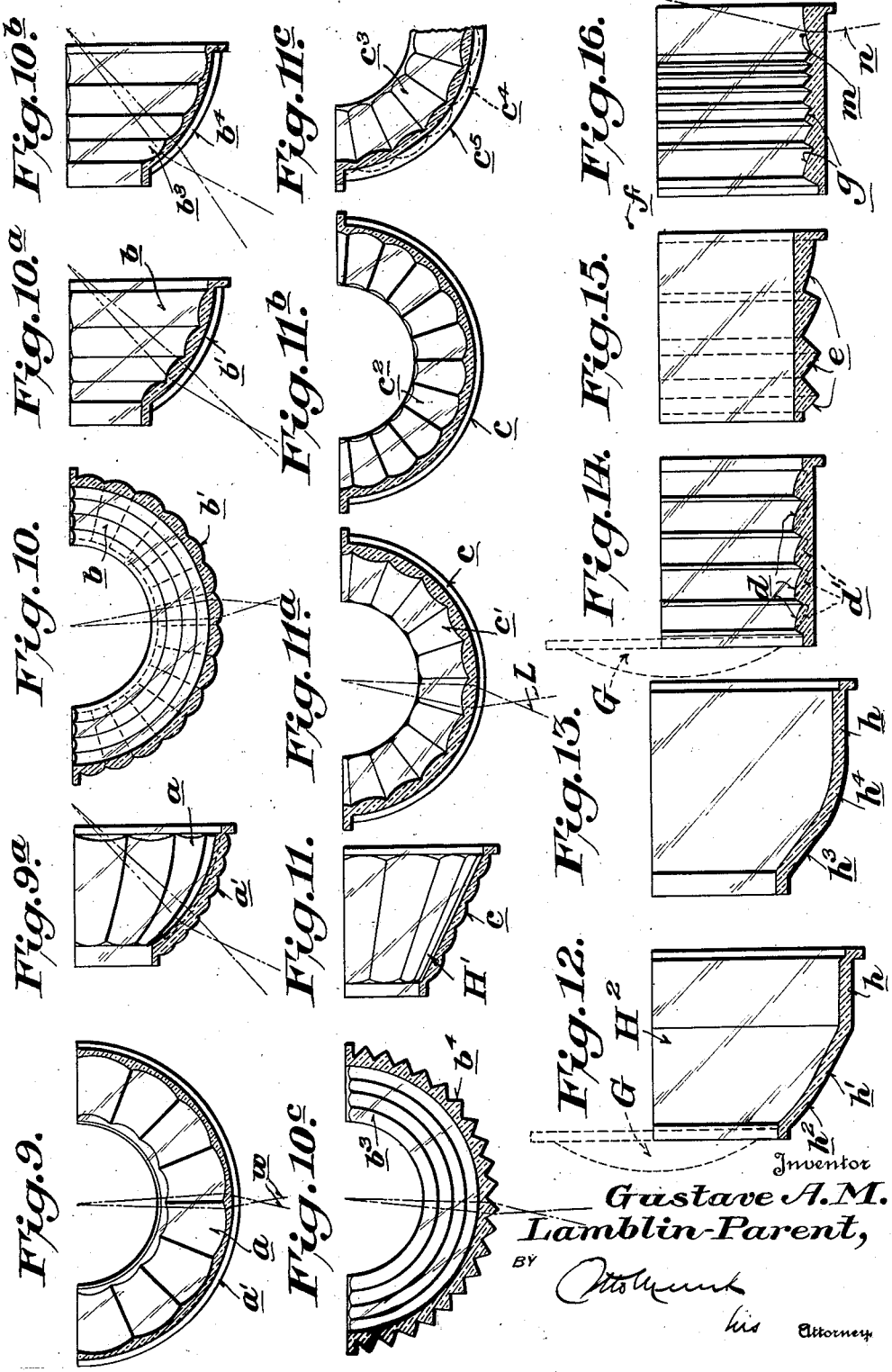

Patented Apr. 17, 1934

1,955,603

UNITED STATES PATENT OFFICE 1,955,603

LIGHT PROJECTOR

Gustave Alphonse Marie Lamblin-Parent, Ronchin, near Lille, France, assignor, by mesne assignments, to United States Holding Corporation, a corporation of Delaware Application August 4, 1930, Serial No. 472,841
Renewed August 22, 1933

11 Claims. (Cl. 240—7.7)

My present invention is for a light projector, more particularly directed to an aviation light adapted to be used on aircraft and to light the intended landing area, or the terrain over which the aircraft is passing. This application forms a continuation in part of my application Serial No. 413,361.

The invention while suitable for use as a light for aircraft, will be found useful for other purposes such as the lighting of streets and highways and the illumination of other areas.

In my said application, I have disclosed a light projector adapted for aeroplane use which not only illuminates distant obstacles, but which also illuminates a wide area directly beneath the plane and to the sides and forwardly thereof and extending to the distant illumination. In such light projector, I provide an optical system in which I utilize a forward circular Fresnel lens of special construction, and a lower lens of a general semi-circular spherical segmental form. The composite beam projected includes a section of substantially parallel rays, none of which are above the horizontal, projected by the upper part of the Fresnel lens, and which strongly illuminate the distant regions in front of the projector; a centrally located downwardly spreading section which proceeds from the lower central portion of the Fresnel; divergent sections which light on each side of the central downwardly spreading section, and which are of greater angle of spread, and which proceed from fluted portions of the Fresnel on each side of the lower central portion; and a fourth section which proceeds from the lower lens, and which lights the region below the airplane and forwardly and to the sides thereof. The composite beam in vertical angle is substantially 90°, and horizontally at and below the axis spreads through substantially 180°, the various sections of the beam overlapping to form a thoroughly illuminated field, of which the strongest illumination is that provided by the part of the Fresnel at and above its center, and which is projected to distant regions. I have also shown in such application certain structural embodiments, which I utilize in connection with the lamp having the optical characteristics disclosed.

My present invention retains the optical characteristics disclosed in said application, and provides certain modifications in the optical elements and structural characteristics.

One of the principal objects of my present invention is to provide modifications in the lower lens for cooperating with the remaining elements.

Another object of the invention is to provide a lamp mounting by which the lamp may be shifted from the forward to the rear part of the housing and vice versa and still be adjustable to focus, to make room for the mounting of a supplementary reflector for augmenting the light flux projected through the lower lens, or the mounting of light screens within the housing to provide a signal system where such is desired, as for instance in military work.

Another object of the invention is to provide a lamp mounting having the above characteristics, which embodies novel means for adjusting the filament to the desired position with reference to the focal point of the optical system, and which embodies means for absorbing vibrations to which the lamp is subjected in aviation work.

Another object of the invention is to provide a novel mounting for the projector as a whole, having provision for the absorption of vibration and shocks, such as occur, for instance, in landing or in taking off.

A further object of the invention is to provide interchangeable optical and mechanical elements which are interchangeably mountable upon the rear portion of the housing for use in connection with ground illumination, signaling and current supply.

With these and other objects in view, which will become apparent as the description proceeds, the invention resides in the construction, combination and arrangement of parts hereinafter more fully described and claimed.

In the accompanying drawings, which are illustrative of forms which the invention may take:—

Figure 1 represents a vertical longitudinal sectional view through a projector according to my invention, the reversed position of the lamp and its mounting being indicated in dotted lines.

Figure 1a represents a front view of the forward lens.

Figure 2 represents an elevational view, partially in section, of the projector, adapted for use with a dynamo.

Figure 3 represents an elevational view, showing the rear section replaced by one of another form.

Figure 4 represents a fragmentary elevational view, showing another form of lens used in the rear section.

Figure 5 represents a sectional view, showing another adaptation of the invention.

Figure 6 represents a view, similar to Figure

Figures 7 and 8 are elevational views, showing the main mount for the projector.

Figures 9 and 9a are transverse and longitudinal sectional views respectively, of a modified form of lower lens.

Figures 10, 10a, 10b and 10c are sectional views of other forms of the lower lens, Figures 10 and 10c being taken transversely and Figures 10a and 10b being taken longitudinally.

Figure 11 represents an elevational view of a frusto-conical form of lower lens.

Figure 11a represents a fragmentary longitudinal view of the lens shown in Figure 11.

Figures 11b and 11c represent fragmentary transverse sectional views of modifications of the lens shown in Figure 11.

Figures 12 and 13 represent longitudinal sectional views of lower lenses, showing combinations of cylindrical, spherical and conical sections; and Figures 14, 15 and 16 represent longitudinal sectional views of cylindrical forms of the lower lens having Fresnel steps.

Referring more particularly to the drawings, the projector includes a casing A provided with a removable rear section B (Figure 3), which, together with the casing, is stream-lined, so as to afford minimum resistance in the passage of the projector through the air when used as an aviation light. The section B tapers off toward its rear end to prevent the formation air whirls or eddies. The body portion proper of the casing terminates at its lower edge substantially in the horizontal plane of the axis of the projector, and intermediate its ends, at about its largest diameter, the casing is provided with a depending substantially semi-annular ring or segment C, which extends below the axis. The forward end of the casing is provided, above the axis of the projector, with a semi-annular ring or segment D, smaller than the lower segment C, and the front segment D carries a ring E, which, in conjunction with a forward ring F, supports a front lens G. The lower half of the ring E may be channeled, as indicated at 5, to support the forward edge 6 of a lower lens H, the rear edge 7 of which is supported in the forwardly projecting flange 8 of the lower segment C.

The lens G is centered substantially on the optical axis o—a of the projector, and the lens H, at its upper edge, lies substantially in the horizontal plane of such axis, and is otherwise arranged therebelow, the front and rear edges of the lens H lying substantially in parallel planes transverse to the axis, the forward edge being of semi-circular shape, and of smaller diameter than the rear edge.

The lens G has a spherical front face and is provided, on the upper half of its rear face, with a series of substantially semi-circular refracting zones 129, and on its lower half another series of substantially semi-circular refracting zones 130, the latter being continuous at their outer edges with the outer edges of the upper zones, and being toward their inner edges of decreasing thickness with respect to the upper zones, a series of substantially horizontally arranged, abrupt shoulders 131, extending substantially diametrically of the lens, separating the upper and lower zones. Arranged centrally of the lens is a bull's eye 132, the lower half of which is of different curvature than the upper half, increasing in thickness towards its outer edges with respect to the upper half, and across which the shoulders extend. The zones 129 in the upper half of the lens and the upper half of the bull's eye have a common principal focal region at X, and the lower zones 130 and lower half of the bull's eye have a principal focal region at Y, the zones 130 being of cylindrical curvature radially of the lens and being struck from centers arranged at decreasing distances below the optical axis, and with decreasing radii, as indicated at 133, the upper zones being struck with increasing radii along the optical axis, as indicated at 134. The lens may be provided, if desired, with flutes 135, and such flutes may be arranged on the side and upper portions of the lens beyond the bull's eye, as shown. The flutes will cause a lateral spreading or dispersion of the portions of the beam passing therethrough, to obtain the desired lateral distribution of the light in the beam.

The lens H on its inner face is provided with a series of longitudinally extending convex flutes 136 which decrease in width towards the forward edge of the lens, and these flutes with the outer face of the lens form a series of double convex lenses somewhat similar to the flutes c' of Figure 11a. The lens H may have its outer face provided with a series of circumferential semi-annular refracting zones, whose refracting faces 137 in sections axially of the lens increase in angular relationship with the lens axis as the rear edge of the lens is approached.

With the optical elements arranged as described, and with the light source at the principal focal region X, the upper half of the lens G will project a section of the entire beam, composed of parallel rays such as i, which serve to penetrate to a distance and illuminate the landing field, or other area or obstacles, at a distance from the projector, while the lower portion of the lens G projects a section of the beam, the rays of which from substantial parallelism adjacent the axis, diverge or spread as the outer edges of the lens are approached. The rays passing through the vertical flutes 135 will spread laterally, and the rays passing through the zones 130 cross each other, with the sections of the beam projected by such zones overlapping the sections projected by adjacent zones, as indicated by the rays K. The rays of light projected through the lens H are crossed by the flutes 136, similar to the rays L, Figure 11a, with the light passing through one flute overlapping (after crossing) that passing through adjacent flutes, and as indicated in Figure 5, such rays are, by refracting zones 137, spread longitudinally of the lens with the angle of spread increasing as the forward edge of the lens H is approached, the light projected by the forward edge of the lens overlapping that which is projected by the outer edges of the lens G, as indicated. The crossing and spreading of the rays by the lower portions of the lens G, and by the lens H, result in substantial uniformity of the light projected through these portions, the intensity of such light, however, decreasing from the optical axis outwardly. The entire beam, in vertical section longitudinally of the axis covers substantially 90°, extending substantially vertically downwardly at its rear edge, and being substantially horizontal in its upper edge, and in vertical section transversely of the axis and below the same, covering substantially 180° for the portions of the beam projected by the lower half of the lens G and the lens H. Thus not only are regions in front of and at a distance from the projector lighted, but also intermediate regions, and regions directly beneath as well as to the sides and forward of the projector.

In order to increase the proportion of the light flux from the source which is to be projected into the beam, I may utilize a concave stepped condenser, shown in dotted lines at J, Figure 4, and mounted in suitable manner, in combination with the lens G. The condenser is provided with spherical stepped refracting zones on its outer face, to gather or condense the light passing through the condenser and project it on to the lens G. The focal region of the system formed by the upper half of the lens G and the condenser, may be located, for instance, at V, and the focal region of the system produced by the lower half of the lens and the condenser may be at V'. It is desirable to locate the light source substantially at the focal region V, to preserve the parallel characteristics, and hence the penetrating power, of the beam projected through the upper half of the lens G, but the light source may be located behind this region, to converge the upper beam section and superimpose it on the section of the beam projected through the lower half of the lens. Where the condenser is used, it is preferable to design the refracting elements of the lens H with a focal region substantially at the position chosen for the light source, as for instance, at the focal region of the system produced by the upper lens half and the condenser.

The lens G may be used in a light projector in which the condenser J is omitted, if desired, with the light source located with reference to the focal regions of the lens in similar relationship to that which has been set forth concerning the location of the light source with reference to the focal regions of the system produced by the lens and the condenser, and similar results concerning the beam projected will be obtained, the only difference being that the amount of light comprising such beam will be less without the condenser than when the condenser is used.

In mounting the lamp I, according to my present invention, I make use of a central post 10 having a sleeve 11 slidable thereon and retained in position by nuts 12. The post 10 depends from the upper wall of the lamp casing, preferably in the vertical axis of the focal region of the optical system of the projector. The sleeve 11 has an ear 13 thereon, to which is pivoted an ear 14 projecting from a ring 15, which ring encircles the lamp.

Diametrically opposite to the ear 14 is a similar ear 16, formed on the ring 15, which is pivoted to an ear 17 provided on a sleeve 18, which encircles and is slidable on a post 19. The latter is pivoted at 20 to a leaf 21, which may be secured by a screw 22 or otherwise to a lug 23 formed on the interior of the lamp casing. Nuts 24 retain the sleeve 18 in adjusted position upon the pivoted post 19. Such post is arranged forwardly of the central post 10, so that the ring 15 is thus disposed in the forward end of the projector casing in the position shown in full lines in Figure 1, the lamp extending rearwardly at an angle.

A dotted line position of these parts is also indicated in Figure 1, such position being that taken when the lamp support is detached from the lug 23, is swung bodily about the central post as a pivot, and is attached to the lug 23' formed on the projector wall to the rear of the central post, in which latter position the lamp extends from the rear portion of the projector housing at an angle forwardly. If the lamp filament, before shifting the lamp from its forward to its rearward position, is in the axis of the central post, it will be observed that the shift of the lamp will not disturb its position with reference to the focal region, and no new adjustment of the lamp will be necessary.

By adjusting the sleeve 11 up and down on the central post, and the sleeve 18 along its post, the lamp may be raised and lowered and shifted forward and back, to obtain the desired focal position, when the lamp is initially installed, or when it is desired to adjust its filament with reference to the focal region. It may be desirable to adjust the filament to a position above the normal focal region, which would result in a shift of the entire projected beam somewhat downwardly, in order to absolutely suppress and prevent the projection of any rays above the horizontal. One of the advantages of this is to allow the pilot, when the invention is used as an aviation light, to see better in foggy weather, assuming that his head is above the horizontal plane of the axis of the projector, by preventing the formation of a screen or halo, visible to the pilot, or which might happen by reflection of light from the moisture particles back to the pilot's eyes, should any of the rays project upwardly beyond the horizontal. I have found that, where all upwardly projecting rays are suppressed, the moisture particles in the atmosphere do not reflect rays back to the eyes of the pilot, and hence the halo or screen, so commonly observed when a light is directed into a fog, is not visible to the pilot, and he is, therefore, able to observe ahead to the full depth of the penetrability of the light rays through the fog.

The ring 15 is provided, along a diameter substantially at right angles to the diameter containing the ears 14 and 16, with guides 25 through which extend rods 26, one on each side of the lamp, such rods at their lower ends being provided with the nuts 27 and at their upper ends being attached to the socket 28, which receives the lamp base. Coil springs 29 and 30 are interposed on the rods 26 between the guides 25 and the nuts 27 and lamp socket 28, respectively. Such springs resiliently support the rods 26 in the guides 25, and hence the lamp, there being a clearance between the lamp and the ring 15. By adjusting the nuts 27, the tension on the springs 29 and 30 may be adjusted to the desired degree. Such nuts also form a further adjusting means for the focal adjustment of the lamp filament.

The upper wall of the lamp casing is provided with an opening 31 through which the outer portions of the lamp may extend, to allow of a lamp of relatively long cylindrical shape, of a type I have found to be advantageous, to be used, without making the dimensions of the body portion of the lamp casing excessive. Over this opening, and covering the lamp socket and outer end of the lamp, is arranged a cover 32, which may also be stream-lined in horizontal section, such cover being detachably retained in place by means of screws 33, or other suitable fasteners. A second opening 34, similar to the opening 31, may be formed in the lamp casing to the rear of the central post, to receive the outer end of the lamp in its rear dotted line position, and this opening is provided with a substantially flat cover 35, which may be interchanged with the cover 32 when the lamp is shifted to its rear position, so that the flat cover may then close the forward opening and the dome-shaped cover 32, close the rear opening and house the upper end of the lamp, and its socket. The cover 35 may, if desired, be provided with a lens 35', of suitable shape for forming an upwardly projecting beam, as a position indicating signal, where such is desired, or when the projector is used on vessels.

In shifting the lamp from one position to the other, after the leaf 21 has been detached, it may be necessary to depress the lamp and its socket, but this can be readily done by reason of the resiliency of the spring mounting of the lamp, such compression being released when the lamp is in its new position, to allow it to re-assume its prior position with reference to its supporting means. The pivots between the ears of the ring 15 and the sleeves 11 and 18, and the pivot at 20 between the post 19 and the leaf 21, allow the various adjustments of the lamp without causing the portions of the lamp carrier to bind.

The rear end of the main casing A of the projector may be flanged, as at 36, and the removable rear cover section B may fit over a shoulder formed by this flange, being secured in position by screws 37 or other suitable detachable means.

Where the projector is to be used as a signaling medium, as by a squadron leader for flashing visual signals to pilots in his command, the removable rear section B may be replaced by a similar section B' (Figure 1), having at its rear end a lens N, for transmitting and properly directing light to the rear, a system of colored screens O being mounted within the projector casing in such position that the screens may be brought between the light source and the lens N to intercept the angle of light subtended by the lens, so as to transmit the desired signals by color indications.

The lens at its outer surface may profile the metallic section B, that is to say, its surface may form a continuation of the tapered and stream-lined formation of the projector casing, and on its inner surface it may, if desired, be formed with stepped zones 41, of desired formation, to form, in combination with the outer surface of the lens N, prismatic zones for directing the projected light in the desired directions.

Instead of using the lens N, I may, if desired, use a lens P, as shown in Figure 5, of conical formation on the outside, and this lens may be provided with refracting zones 42 for modifying the direction of the projected rays as desired. Or, I may use a stream-lined glass cover section B'' at the rear, as shown in Figure 6.

The system of light screens O includes a shaft 43, extending longitudinally of the projector housing, and carried at its ends in brackets 44, which project inwardly from the wall of the casing, being provided with ears 45 for receiving screws or other fastening means 46 for rigidly mounting the brackets on the projector casing. Arranged upon the shaft 43 are a plurality of rings 47 having extending therefrom hubs 48, which surround the shaft between the brackets 44. Mounted in these rings are the light-transmitting screens 49, of desired color. The screens may be normally maintained out of the path of the light projection from the focal region to the rear signaling lens by means of springs 47', which may be attached at their inner ends to the rings supporting the color screens, as at 50, the outer ends of the springs being attached to the wall of the casing, as at 51. Flexible cables 52 may be used for controlling the light screens, and the screen having the color indication for the desired signal may be brought into the path of the light rays, as shown in Figure 1, to give the desired color indication, by pulling the cable connected with the screen desired. At their inner ends, the cables are attached to ears 54, projecting from the periphery of the rings 47, in a manner similar to that in which the springs 47' are connected to the rings, but on the opposite side from the springs. The cables may extend through eyelets 55, provided in the wall of the casing, and thence to control means, not shown, in the cockpit of the aircraft. Upon releasing the cable, the screen will assume its normal position out of the path of the light beam, to thereby terminate the signal indication. Where the casing is to be provided with interchangeable rear sections, it is desirable to mount the screen system on the section with which the lenses N or P may be used, so as to be removed with such section, as for instance, when the dynamo is to be used, or a non-light transmitting rear section, such as B. It will be understood, however, that the screen system, and the rear lenses, may be used in connection with the projector having the form shown in Figure 5, to be hereinafter described.

The rear cover section may be removed, and its place taken by a dynamo, indicated generally at L, as illustrated in Figure 2, such dynamo being driven by a propeller M, actuated by the passage of the light projector through the air in flight, and while taking off and landing. Suitable connections for the current flow between the dynamo and the lamp will, of course, be provided, such connections not being illustrated as they are well known. The dynamo may be carried by a flange or base 38, detachably secured to the flange 36 by bolts 39, or otherwise. When the dynamo is used, the removable rear section B can be replaced by a section B², similarly connected with the casing of the projector, as at 37', and similarly tapered and stream-lined. Such section B² encloses the dynamo, and at its rear end terminates short of the dynamo propeller, so as not to interfere with the rotation of the latter. It may also closely surround the rear end of the dynamo, and be detachably connected thereto by screws 40 or otherwise, to effectively house the dynamo, in cooperation with the remainder of the projector housing, against the entrance of rain or moisture.

In the form of the invention shown in Figure 5, the rear lens P, is shown in connection with a lower lens H', similar to the lower lens H. In this form of the invention, the rear end of the lamp is provided, above the axis of the projector, with a semi-annular ring or segment D', similar to the forward segment D, and a ring E', similar to the forward ring E, supports the rear lens and the lower lens H', in the manner already described with reference to the forward lens, a ring F' being utilized to maintain the rear lens in place. In this figure, the lamp is shown as having been shifted to its rear position, to make place in the forward part of the lamp casing for a supplementary reflector R, for augmenting the light projected through the lower forward lens H, rays of light from the source striking such reflector and being projected thereby onto the lower lens to increase the illumination in the lower portion of the beam. In this form of the invention, the screen system O may also be used, by removing the reflector R from its mountings 56, shifting the lamp to its forward position, to make room for the screen system, and mounting such system in the rear portion of the housing, in the space formerly occupied by the lamp. Or, if desired, the screen system may be used with the lamp in its rear position, and with the reflector R mounted in the forward part of the lamp, by mounting the screen system to the rear of the space occupied by the lamp and its support, there being room for such mounting, as indicated in dotted lines at O². In this case, the screens when depressed would not intercept as great an angle of the light flux as would be the case when mounted immediately to the rear of the lamp, with the latter in its forward position, where they would intercept the whole angle of light extending through the rear lens P', but would intercept sufficient of the light to give colored signal indications to following pilots within more limited angles.

In this form of the invention, also, I utilize the lower segment C', to support lenses S, of double convex or other desirable form, for projecting beams of light T having sufficient spread to overlap adjacent edges of the beams projected by the forward and rear lower lenses H and H', so as to build up the twilight or gray zone between such beams, and increase the illumination directly below the lamp. The focal region is preferably arranged in the plane containing the centers of the lenses S and midway between the front and rear lower lenses H and H', so that the light projection will not be disturbed in shifting the lamp from its front to rear position, and vice versa, assuming the lamp to have been adjusted to such focal region. The lenses S are arranged in cut-out portions of the lower segment C', and there may be a plurality of such lenses arranged at spaced distances from each other, the openings being separated so as to allow for intervening webs of metal, to thereby not decrease the strength of this lower segment beyond safe limits.

I use, as illustrated in Figures 7 and 8, a novel support for the projector, for attaching it to the fuselage or wing, or any other available point on the aircraft, which support aids in the absorption of shocks and jolts that may be incurred in landing or taking off. The support is in the nature of a fork having branches 57 extending from both sides of a base 58, which latter is adapted to be screwed, or otherwise attached, to an available surface of the aeroplane, as indicated at 59. The fork overhangs the rear portion of the light projector, in spaced relation thereto, and to the lower end of the branches 57 are attached, by means of bolts or other suitable fastenings 60, resilient blades 61, which may be mounted between resilient stay blades 62 of shorter length. The lamp is mounted between forward ends of the blades 61, through the medium of lugs 63 formed on the exterior of the lamp casing, and which may be bolted or otherwise secured, as at 64, to the blade ends. It will be understood that there is a system of spring blades on each side of the projector, each system being connected to one of the arms of the fork.

Where it is desired that the angular position of the axis of the projector may be adjusted with reference to the fork, the connection between the resilient blades and the projector casing may be made adjustable, as indicated in Figure 8. In this arrangement, cylindrical lugs 63' are carried by the projector and bearings 64' are secured, as at 65, to the forward end of the blades 61, such bearings having openings receiving the lugs 63', so that the lamp may be turned about such lugs as pivots, to secure the desired angular position. When in such position, set screws 66, carried in the bearings, may be tightened down upon the lugs 63 to lock the projector in its adjusted position.

By the construction provided, while the blades 61, augmented by the stiffening effort of the blades 62, are sufficient to prevent movement of the projector during flight, should a rough landing or take-off be encountered, the blades will give under the shocks to ease the transmission of the shocks and jars to the projector, and will thus aid the spring mounting of the lamp, in protecting the filament thereof against breakage.

Should it be desired, for certain purposes, to mount the projector upon the upper wing surfaces, or upon the top of the fuselage, this can be done by detaching the fork and its springs from the lugs 63, in the case of the structure shown in Figure 7, and from the bearings 64', in the case of the structure shown in Figure 8, reversing the position of the fork with reference to the projector, so that the fork will be therebelow, and again connecting the springs with these parts. The fork is spaced sufficiently above or below the projector as the case may be, to allow of movement of the latter under the impulse of jolts, without coming in contact with the branches of the fork.

In my said application, the lower lens corresponding to the lens H is illustrated as of general semi-circular spherical segmental form, having on its inner face a series of longitudinally extending convex flutes, decreasing in width toward the forward edge of the lens, and on its outer face having a series of circumferential semi-annular refracting zones, whose refracting faces in sections axially of the lens increase in angular relationship with the lens axis as the rear edge of the lens is approached.

I may use various forms of longitudinal flutes and circumferential or transverse prisms, and have illustrated a number of them herein, and I may also use various forms for the shape of the lens H as a whole, as is also illustrated.

In Figures 9 and 9ª, the longitudinal flutes $a$ are concave, which, with the outside convex face of the lens, form concavo, convex lenses for crossing and spreading the rays W transversely of the projector. The elements $a'$ on the outside are in the form of cylindrical prisms for crossing and spreading the rays longitudinally of the projector. It will be understood that the cylindrical prisms $a'$ may be used on a lens in which the longitudinal flutes are convex on the inside, if desired.

In Figures 10 and 10ª, 10ᵇ and 10ᶜ, the lower lens is provided on the inside with transverse, instead of longitudinal, flutes and on the outside with longitudinal, instead of transverse, refracting elements. The tranverse flutes may be convex to form double convex lenses with the outside surface, as illustrated by the lenses $b$, and the longitudinal elements may by cylindrical, as shown at $b'$. Or, the transverse inside flutes may be concave, as at $b^3$ in Figure 10ᵇ, to form concavo-convex lenses with the outside surface, and the longitudinal outside flutes $b^4$ may be in the form of angular ribs, as indicated in Figure 10ᶜ. In these cases, the rays will be crossed and spread, to cause an even distribution of the light as indicated.

I may, if desired, make the lower lens of a general frusto-conical shape, as shown at H' in Figure 11, and may apply to it the various forms of longitudinal and transverse refracting elements that I use in connection with the lens of general spherical segmental form. For instance, the longitudinal flutes or prisms may be of convex or concavo-convex or double convex form and the transverse prisms may be of cylindrical or double convex or concavo-convex or double concave or angular form. I have indicated in Figures 11 and 11ª the use of cylindrical transverse elements c on the outside of the frusto-conical lens. In Figure 11ª, longitudinal convex flutes c' have been indicated on the inside of the frusto-conical lens. In Figure 11ᵇ, concave longitudinal flutes c² are illustrated, and in Figure 11ᶜ convex longitudinal flutes c³ have been indicated on the inside, with complementary convex longitudinal flutes c⁴ on the outside, as well as the transverse refracting elements c⁵ on the outside. The action of these various forms of refracting elements on the light rays, it is thought, will be understood, without further illustration. The elements act thereon to spread the light transversely and longitudinally of the lens, to even the distribution of the light and to cause the forward portion of the beam projected through the lens to merge with the lower portion of the beam projected by the front lens of the projector with which the lower lens is used in combination.

In Figure 12, I illustrate the use of another form of the lower lens as a whole. In this figure, the front lens is indicated in dotted lines, and the lower lens H² is composed of a rear section h of cylindrical formation, which merges with a central section h' of frusto-conical formation, which in turn merges with a forward section h² of spherical segmental form. Preferably, the axes of the cylindrical and frusto-conical portions coincide with each other and with the optical axis of the projector, and contain a diameter of the sphere of which the forward section h² is a segment. This construction of lens H² may be used in conjunction with the forward lens G, as before. In Figure 13, I also use the combination of the cylindrical, frusto-conical and spherical sections, but, in this instance, reverse the position of the spherical and conical sections, the latter being the most forward section, as indicated at h³, the spherical section occupying the middle position, as at h⁴, and the cylindrical section occupying its rear position h as before. In these forms of the invention, the longitudinal and transverse refracting elements before described, or any desired combination thereof may be used. They have been left out of the illustration of Figures 12 and 13, for purposes of clarity of showing. By using the combination of the cylindrical, conical and spherical sections in the lower lens, I am able to modify and increase the intensity of the illumination of a portion or portions of the beam projected from the lower lens with reference to the remaining portion or portions of such beam, by comparatively reducing the angle of incidence on certain portions of such lens. For instance, in the form shown in Figure 12, the portion of the beam projected through the conical section h' would be more intense than that projected through the cylindrical portion h, because the section h' is more nearly normal to the incident rays than the section h. And, if the center of curvature of the spherical section h² is at the focal region, the beam section projected by this section would be somewhat more intense than that projected by the section h'. But, if such center of curvature were taken sufficiently far from the focal region, the angle of incidence of the rays on the spherical section would be greater than that on the conical section, and the latter would project the beam section of the higher intensity. I may, if desired, also shift the cylindrical section with reference to the conical and spherical sections of the lens. For instance, the cylindrical section could fall intermediate the conical and spherical sections, or could be the foremost section, with either the conical or the spherical section occupying the rearmost position in the combination. It is not believed necessary to illustrate these variations, as their arrangement will be well understood from the foregoing description.

I may also, if desired, make the lower lens entirely in the shape of a cylindrical Fresnel, as shown in Figures 14, 15 and 16, and may arrange the zones on the inside or outside thereof as illustrated. The steps of the Fresnel may be in the form of convex prisms, struck from separate centers along a horizontal line and with the same radius of curvature, and arranged on the inside, as indicated in full lines at d in Figure 14, or they may be concave, as shown in dotted lines at d' in such figure. Or, the zones may be arranged on the outside with the steps e struck from a single center, as, for instance, from a point in the focal region f, with decreasing radii as the steps progress rearwardly, and with the width of the steps increasing rearwardly, as shown in Fig. 15. Or, the steps may be arranged on the inside of the lens, as shown at g in Figure 16, being struck from a single center, with decreasing radii as the steps progress forwardly and with increasing width of the steps forwardly, as indicated in Figure 16. In this last arrangement, if desired, the rear portion of the cylindrical lens may be occupied by a step m, reversed with reference to the other steps, and of substantial width, to thereby spread part of the light downwardly and somewhat to the rear, as shown by the ray n.

It will be found that the light distribution resulting from my invention can be put to various uses such as the illumination of streets and highways, fields, and other areas that it may be desired to illuminate.

The lower lenses of the various forms referred to are in the nature of surfaces of revolution about an axis substantially parallel to, and which if desired coincides with, the optical axis of the front lens, and while in certain of the claims the lower lenses have been referred to as substantially semi-cylindrical, it will be understood that this term is not to be interpreted in its strict sense, but is to be understood as a term which is inclusive of the varieties of forms which the lower lenses may assume within the scope of the invention and the range of equivalents to which it is entitled.

While the foregoing detailed description has been given for purposes of clearness of illustration of the invention, it will be understood that no undue limitations should be deduced therefrom, but that variations in the construction, combination and arrangement of parts, and the uses to which the invention may be put, may be made within the range of equivalents to which the invention is entitled without departing from the scope of the claims.

While my present application discloses in part subject-matter disclosed in my before mentioned application, Serial No. 413,361, I include in this application, claims to the subject-matter not disclosed in my before mentioned application, claims to the common subject-matter being made in that application.

Having thus described my invention what I claim as new, and desire to secure by U. S. Letters Patent is:—

1. A light projector comprising a casing, a front lens carried by the casing, a lower lens carried by the casing with its forward edge substantially contiguous with the lower edge of the front lens, a tapering rear section removably carried by the casing, and a rear lens carried by said rear section opposite said front lens.

2. A light projector comprising a casing, forward and rear lenses carried by the casing, lower segmental lenses carried by said casing, the focal region of said lenses being substantially intermediate said segmental lenses, a lamp having a filament located substantially at said focal region, and a mounting for said lamp including a pivotal member arranged above said focal region and about which said holder may pivot for allowing the lamp to be shifted from one end of the casing to the other without materially altering the position of its filament with reference to the focal region.

3. A light projector comprising a casing, light-emitting lenses carried thereby, said lenses having a focal region, a lamp arranged with its filament substantially at the focal region, and a holder for the lamp pivotally mounted on an axis disposed vertically above said focal region, whereby the lamp may be shifted about said axis without materially altering the position of the filament with reference to the focal region.

4. In a light projector, the combination with a front lens, a lower lens of substantially semi-cylindrical form arranged with its forward edge substantially contiguous with the edge of the lower half of the front lens, the lower lens being provided with concave flutes and with convex refracting elements arranged substantially at right angles to said flutes.

5. In a light projector, the combination with a front lens, a lower lens of substantially semi-cylindrical form having its axis substantially co-incident with the axis of the front lens, the lower lens being provided with convex circumferential flutes thereon, and longitudinally extending refracting elements thereon.

6. In a light projector, the combination with a front lens, a lower lens of substantially semi-cylindrical form having its axis substantially coincident with the axis of the front lens, the said lower lens being provided with concave circumferential flutes and with convex longitudinal refracting elements.

7. In a light projector, the combination with a front lens, a lower lens of substantially semi-cylindrical form having its axis substantially coincident with the axis of the front lens, said lower lens being provided with convex circumferential and concave longitudinal refracting elements.

8. A light projector comprising a casing, a front lens carried by the casing, a light source carried by the casing, a removable rear section carried by the casing and having a lens arranged opposite said front lens, a series of vari-colored screens carried by the rear section on an axis parallel to and off-set from the axis of the said lens, and means for interposing said screens between the light source and the rear lens.

9. An aviation light comprising a casing, light-emitting lenses carried thereby, a light source carried by the casing, dynamo carried by the casing for supplying current to the light source and having an air stream driven propeller, and a cover section carried by the casing and enclosing the dynamo.

10. A light projector having an opening at its forward end, comprising a front lens closing said opening and having on its upper half a series of refracting zones, and on its lower half a series of refracting zones of different curvature and of longer focal length than the zones on the upper half of the lens, a lower lens having its forward edge substantially contiguous with the outer edge of the lower half of the front lens, and a concave stepped condenser arranged above the lower lens and forming with the upper half of said front lens a system having a shorter focal length than the system formed by the lower half of said front lens and said condenser, said lower lens having a focal region substantially at one of the focal regions of the system.

11. A light projector comprising a casing having a forward opening, a front lens mounted in the opening having on its upper and lower halves stepped refracting zones of different focal lengths, respectively, a condenser forming with the front lens a system having for its upper half a different focal region than for its lower half, and a lower substantially semi-cylindrical lens carried by the casing and having a focal region substantially at one of the focal regions of the system.

GUSTAVE ALPHONSE MARIE
LAMBLIN-PARENT.